United States Patent [19]
Martell et al.

[11] Patent Number: 5,519,864
[45] Date of Patent: May 21, 1996

[54] METHOD AND APPARATUS FOR SCHEDULING THE DISPATCH OF INSTRUCTIONS FROM A RESERVATION STATION

[75] Inventors: Robert W. Martell, Hillsboro; Glenn J. Hinton, Portland, both of Oreg.

[73] Assignee: Intel Corporation, Santa Clara, Calif.

[21] Appl. No.: 172,737

[22] Filed: Dec. 27, 1993

[51] Int. Cl.$^6$ .................................................. G06F 9/06
[52] U.S. Cl. .................................. 395/650; 364/DIG. 1; 364/281.8
[58] Field of Search .................. 395/650; 364/DIG. 1

[56] References Cited

U.S. PATENT DOCUMENTS

| | | | |
|---|---|---|---|
| 4,807,115 | 2/1989 | Torng | 364/DIG. 1 |
| 5,031,096 | 7/1991 | Jen et al. | 364/DIG. 1 |
| 5,185,868 | 2/1993 | Tran | 364/DIG. 2 |
| 5,202,993 | 4/1993 | Tarsy et al. | 364/DIG. 1 |
| 5,430,851 | 7/1995 | Hirata et al. | 364/DIG. 1 |

OTHER PUBLICATIONS

M. Johnson, *Superscalar Microprocessor Design*, Prentice Hall, Inc., Chapters 3 and 7, (1991).
Popescu, et al., "The Metaflow Architecture," IEEE Micro, pp. 10–13 and 63–73, Jun. 1991.

*Primary Examiner*—Thomas M. Heckler
*Attorney, Agent, or Firm*—Blakely, Sokoloff, Taylor & Zafman

[57] ABSTRACT

Entries in a reservation station are efficiently scanned to find data-ready instructions for dispatch. A pseudo-FIFO scheduling approach is implemented wherein, rather than scanning every entry in the reservation station, the reservation station is segmented into groups of entries with each entry being scanned to determine which has the oldest entry in it. It is from the group of entries having the oldest entry that a ready pointer is cycled to search for data-ready instructions for dispatch to waiting execution units.

25 Claims, 6 Drawing Sheets

| 29L | 30H | 30L | 31H | 31L |
|---|---|---|---|---|
| increment uop age or reset uop age | wire- or read age for given priority pointer group | scan for oldest age for given priority pointer group | broadcast oldest age to find which entry is oldest.<br><br>scan for 1st oldest if more than one- send priority pointer | begin scheduling selection at priority pointer location |

METHOD AND APPARATUS FOR SCHEDULING THE DISPATCH OF INSTRUCTIONS FROM A RESERVATION STATION

BACKGROUND OF THE INVENTION

1. Field of the Invention

The present invention relates to the field of microprocessor architecture. More specifically, the present invention relates to the field of microprocessor architecture for efficiently coordinating dispatch of data/resource-ready instructions from a reservation station.

2. Art Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

In addition to squeezing performance by overcoming physical limitations, microprocessor design has developed into an art form. Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instruction until the condition is resolved. Since the condition will not be resolved until further down the pipeline, the instruction fetch unit may not be able to fetch proper instructions.

To overcome this problem, many pipelined microprocessors use branch prediction mechanisms that predict the outcome of branches and then fetch subsequent instructions according to branch prediction. Branch prediction is achieved using a branch target buffer (BTB) to store the history of a branch instruction based upon the instruction pointer or address of that instruction. Every time a branch instruction is fetched, the branch target buffer predicts the target address of the branch using the branch history. Speculative execution is where instructions are initiated and completed before knowing if they are the correct instructions. This usually includes prediction with a BTB.

In addition to speculative execution, substantial increases in instruction throughput are achievable by implementing out-of-order dispatch of instructions to the execution units. Many experiments have confirmed that typical von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction dispatching is stalled when there is a conflict for a functional unit or when a dispatched instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are dispatched from the reservation station with little regard for their original program order. For further background on the use of reservation stations and out-of-order execution, see Mike Johnson, *Superscalar Microprocessor Design* and Prentice-Hall, Inc., 1991, Chapters 3 and 7.

In microprocessors implementing reservation stations, including superscalar processors, the reservation station will generally provide data-ready instructions directly from the reservation station to an appropriate execution unit. The scheduling of instructions from the reservation station is a critical stage in the execution pipeline directly affecting system performance. Instructions cannot be scheduled until all data dependencies are resolved and an appropriate execution unit is available. Depending upon frequency and area sensitivities and the number of entries in the reservation station it may not be possible to check every reservation station entry for data readiness at every scheduling cycle. Precautions must also be taken in scheduling to prevent data-ready instructions from aging too long in the reservation station and going stale (thus possibly lengthening total program execution time). It is thus an object of the present invention to develop a scheduling mechanism for a reservation-station equipped microprocessor taking the above concerns into consideration.

SUMMARY OF THE INVENTION

From the foregoing it can be appreciated that there is a need to provide a mechanism for the scheduling dispatches of ready instructions from a reservation station to waiting execution units. Therefore, it is an object of the present invention to provide an efficient scheduling mechanism for use in a microprocessor which incorporates a reservation station.

It is also an object of the present invention to provide a reservation station scheduler which can operate at a high clock rate with a large number of entries in the reservation station.

It is another object of the present invention to provide an efficient scheduler for the dispatch of instructions from a reservation station which minimizes the effects of data-ready instructions aging and becoming stale.

These and other objects of the present invention are provided by a means and method for efficiently scanning the entries of a reservation station to find data-ready instructions for dispatch. To accommodate very high clock rates and die area restrictions, the method and apparatus of the present invention approximate a pseudo-FIFO buffer approach for dispatching instructions when more than one instruction is ready for execution by the same execution unit. Rather than scanning every entry in the reservation station for the oldest ready entry, the reservation station entries are segmented into groups of entries with each group being scanned to determine which has the oldest entry therein. It is from the oldest ready group that a sequential scan begins, wrapping around when necessary.

BRIEF DESCRIPTION OF THE DRAWINGS

The objects, features and advantages of the present invention will be apparent from the following detailed description in which:

FIG. 6 illustrates a portion of a microprocessor pipeline in accordance with the preferred embodiment for reservation station scheduling according to the present invention.

DETAILED DESCRIPTION OF THE INVENTION

The present invention provides a method and apparatus for the scheduling of data-ready instructions for dispatch from a reservation station to waiting execution units. In the following description, numerous specific details are set forth such as particular instruction layouts and specified couplings of execution units to reservation stations in order to provide a thorough understanding of the present invention. It will be appreciated, however, to one skilled in the art, that the present invention may be practiced without such specific details. In other instances, well known control structures and gate level circuits have not been shown in detail in order not to obscure important aspects of the present invention. Particularly, many functions are described to be carried out by various logic and timing circuits. Once the various functions have been described, those of ordinary skill in the art will be able to implement the necessary logic circuits without undue experimentation.

Figure 1:
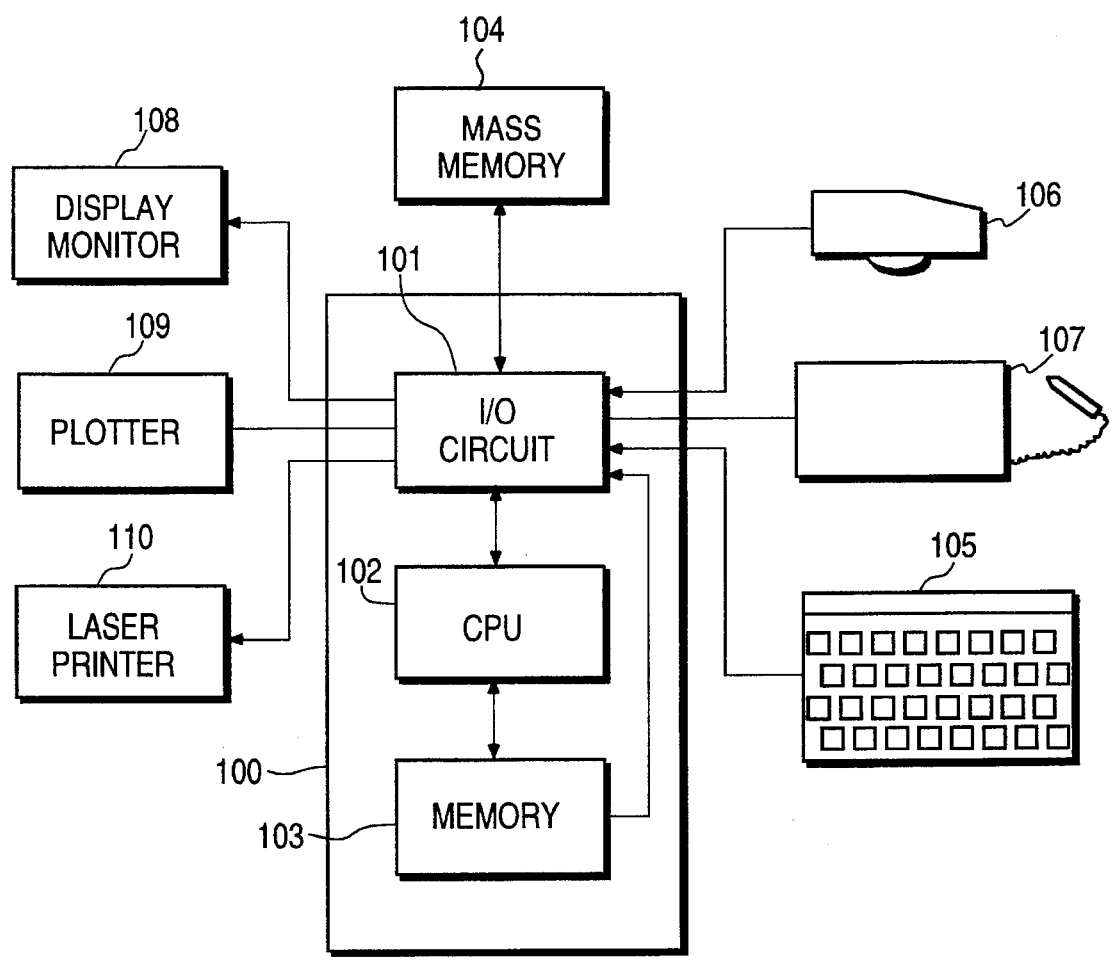
FIG. 1 illustrates a basic computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The preferred embodiment of the present invention is intended to be implemented in a microprocessor that executes the well-known Intel Architecture Microprocessor instruction set. The present invention may, however, be implemented in any microprocessor architecture in which a reservation station is utilized for storing instructions until data and resource dependencies are resolved. A variety of microprocessors may take advantage of the present invention whether those microprocessors occupy a single chip or more than one and regardless of the materials used to fabricate the chip including silicon or gallium arsenide.

The microprocessor of the present invention, prior to executing Intel Architecture Microprocessor instructions, decodes them into a more simple, stylized sequence of "micro-ops." The micro-ops are then analyzed and scheduled according to resolved dependencies thus implementing out-of-order execution. The sequence below shows the mapping of the first six instructions of the Dhrystone trace into their constituent micro-ops ("Gn" is general register n):

| Intel Architecture Instructions | micro-ops |
| --- | --- |
| 000014e8: PUSHw BP <TOS fbfffc3c> | STw IN (G5, G4) OUT (Memfbfffc3c) |
| | SUB IN (SPO, CO) OUT (SPO) |
| 000014e9: MOVw EA, R ESP EBP | MVw IN (G4) OUT (G5) |
| 000014eb: LEAVE <TOS fbfffc3c> | ADD IN (G5, CO) OUT (G4) |

-continued

| Intel Architecture Instructions | micro-ops |
| --- | --- |
| 000014ec: RETn | LDw IN (G5, Memfbfffc3c) OUT (G5) |
| | LDw IN (G4, Memfbfffc40) OUT (TO) |
| | ADD IN (SPO, CO) OUT (SPO) |
| | JMP IN (TO) OUT ( ) |
| 00001625: XORw EA, R EDI EDI | XOR IN (G7, G7) OUT (G7) |
| 00001625: ADDw Ib, EA ESP <IMM 18> | ADD IN (G4) OUT (G4, flags 0) |

It can be seen that the PUSH of the BP register is converted into two micro-ops. The first performs the store of the register and the second adjusts the stack pointer. These two micro-ops are not dependent on each other. The "microcode" corresponding to the PUSH has been written explicitly to allow maximal parallelism wherever possible. It can be seen that some complex instructions translate into multiple micro-ops which may or may not be related to one another, and simple instructions map directly into a unique micro-op (such as XOR or ADD).

Figure 2:
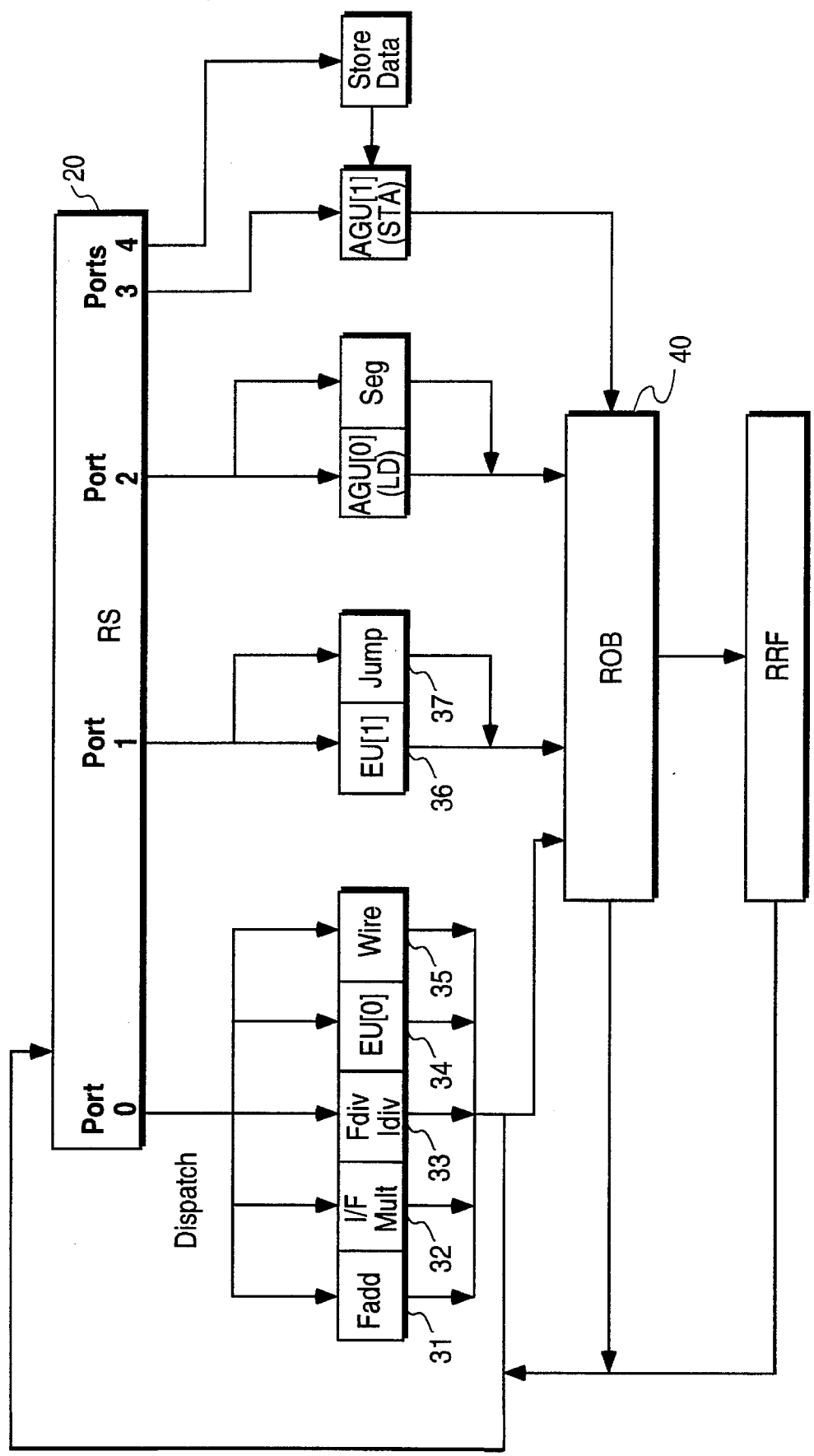
FIG. 2 illustrates a block diagram of the out-of-order core of a microprocessor incorporating the present invention.

FIG. 2 illustrates a portion of the microprocessor incorporating the present invention. The microprocessor implementing the preferred embodiment of the present invention utilizes out-of-order execution of instructions. The portion of the microprocessor illustrated in FIG. 2 can be considered the out-of-order core of the microprocessor. The first element of the out-of-order core illustrated in FIG. 2 is the reservation station 20. The reservation station 20 is a buffer in front of the functional units that holds micro-ops that are waiting for needed resources in order to execute. These needed resources include the source data operands (that previous micro-ops may not yet have created) and a functional unit with which to execute the micro-op.

The reservation station performs several functions. Its data fields serve as a temporary buffer for instructions and the source data that is or will be available. The reservation station maintains waiting instructions and is "watching" all the result/write back buses from all the execution interfaces "looking" for source data that it needs for its micro-ops. When the watched-for data arrives on the result bus, the reservation station writes it into the appropriate source data field.

Once all the source operands for a micro-op are in the reservation station, the reservation station determines when an appropriate execution unit is available and schedules the data ready micro-op for dispatch. It is the scheduling of micro-op dispatch which concerns the present invention.

The reservation station 20 of FIG. 2 is illustrated having five dispatch ports. Primarily, micro-ops in the embodiment illustrated will be dispatched over either Dispatch Port 0 or Dispatch Port 1. In the preferred embodiment microprocessor, there are five execution units coupled to Dispatch Port 0 from reservation station 20. These are the floating point add unit 31, the multiply unit 32 for performing integer and floating point multiplies, integer and floating point divide unit 33, integer execution unit 34, and a wire unit 35. As was described, the complex Intel Microprocessor instruction set is reduced to a simpler stream of micro-ops. These micro-ops, when they are dispatched from the reservation station, are operated on by the various execution units. Most applications heavily utilize the integer execution unit. Integer execution unit 34 is designed to be able to process data-ready micro-ops in one clock cycle. It is therefore referred to as a single-cycle functional unit. The integer execution unit 34 receives data having a width of 32 bits. The floating point execution units 31, 32 and 33 carry out more complicated tasks when they receive data-ready micro-ops. These functional units receive input streams having a width for 86 bits of source data.

In the preferred embodiment of the present invention microprocessor, a floating point add requires three clock cycles to execute, and a floating point multiply requires five clock cycles to execute. Floating point divides and square roots, which are both carried out by the floating point divide unit 33, have variable length latencies depending upon the precision required for their result. The wire unit 35 is a hybrid execution unit implemented in the preferred embodiment for various catch-all instructions. It is similar to a floating point unit in that its input stream is 86 bits wide, but it is more like an integer execution unit in that it performs its operations in a single clock cycle.

Dispatch port 1 from reservation station 20 also has two execution units coupled to it. There is an integer execution unit 36 and a jump unit 37. The integer execution unit 36 may be identical to the execution unit 34, or it may have additional or different functionality. Two integer execution units are provided because of the high volume of integer micro-ops common in most code thereby enhancing performance of the overall system. Of course, alternative microprocessors may incorporate more or fewer execution units depending upon design objectives.

After an execution unit executes a micro-op, it writes back the result to the reorder buffer 40. The reorder buffer 40 serves as the place where the results of out-of-order operations are collected so that they can later be committed to machine state in strict von Neumann order. Thus, the reorder buffer is where the out-of-order core reassembles the instruction stream into its program order before commitment to state. At the same time that execution units write back to the reorder buffer 40, they simultaneously write back to the reservation station 20. It may be that the result of an execution unit's operation provides a source operand needed for the execution of another micro-op waiting in the reservation station.

The focus of the present invention is the scheduling of the dispatch of operations waiting in a reservation station to an appropriate functional unit. The scheduling mechanism of the present invention may be incorporated in any out-of-order execution system utilizing one or more reservation stations for waiting micro-ops. For purposes of illustration, the reservation station arrangement illustrated in FIG. 3 will be described as representative of this class of microprocessor implementation. In the preferred embodiment of the present invention, the reservation station is implemented such that twenty (20) micro-ops at one time may be waiting for all necessary resources required for dispatch to an execution unit.

Figure 3:
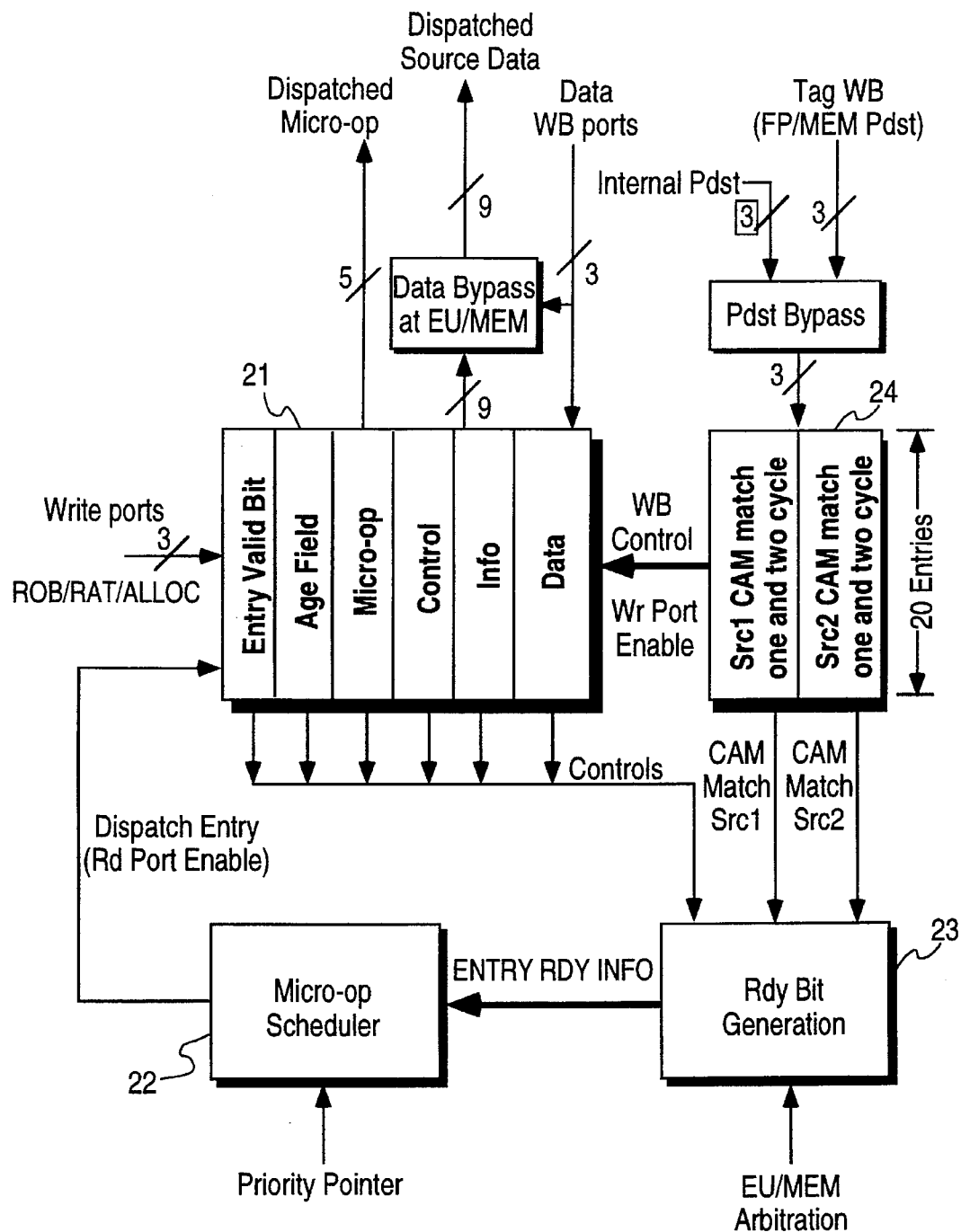
FIG. 3 illustrates a more detailed diagram of a reservation station which incorporates the scheduling mechanism of the present invention.

In FIG. 3, the micro-ops and associated data are shown as a large array 21. The content of information for a given micro-op includes the micro-op instruction, source operands, control bits indicating the validity of the source data as well as information indicating the necessary functional unit for a given micro-op to be dispatched to. The preferred embodiment of the present invention has micro-ops written into the reservation station with data indicating a particular execution unit to be dispatched to. As an alternative to this static binding of micro-ops to specific execution units, it is possible to couple together the various schedulers to be described such that a micro-op capable of executing on multiple execution units may be scheduled to the first that is available when the micro-op is data-ready. By dynamically binding a micro-op to a functional unit at scheduling rather than statically binding at allocation, improvements to overall system performance may be obtained.

Coupled to the reservation station array is the micro-op scheduler 22. The micro-op scheduler peruses the reservation station memory array looking for data-ready micro-ops to dispatch. A micro-op is ready when all valid source data has been determined by the reservation station and an appropriate functional unit is available when the micro-op is ready to be dispatched. Valid source data is determined either by receipt of the data or upon receiving information that the data will be ready in time for scheduling.

The micro-op scheduler 22 is informed of ready micro-ops by receiving a signal from the ready bit generation logic 23. The ready bit generation logic 23 receives input signals that indicate the availability of functional units, the activation of valid bits for source data from the reservation station and any data forwarding information detected by the content addressable memory (CAM) logic 24 which performs tag matching for needed data being concurrently written back.

Figure 4:
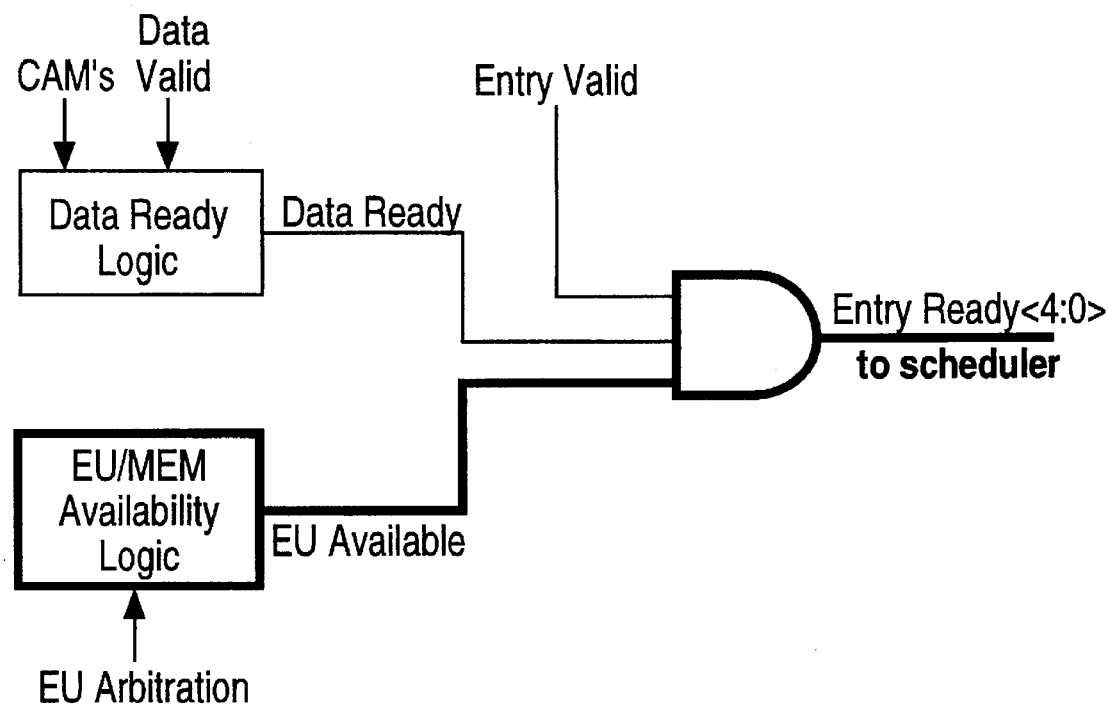
FIG. 4 illustrates a portion of the logic used for indicating data-ready operations stored in a reservation station.

FIG. 4 illustrates a logical block diagram of the ready bit generation circuit 23 to which all dependencies for a micro-op must be signaled before an entry ready bit is supplied to the micro-op scheduler 22 for a given micro-op. The micro-op scheduler also receives a priority pointer to specify where the scheduler should begin its scan of the reservation stations 20 entries. The priority pointer will change according to a pseudo-FIFO algorithm to be described further herein. It should be noted that once a micro-op has been dispatched to a functional unit and no cancellation has occurred due to a cache miss or other reasons, the entry is de-allocated in the reservation station for use by a new micro-op.

Figure 5:
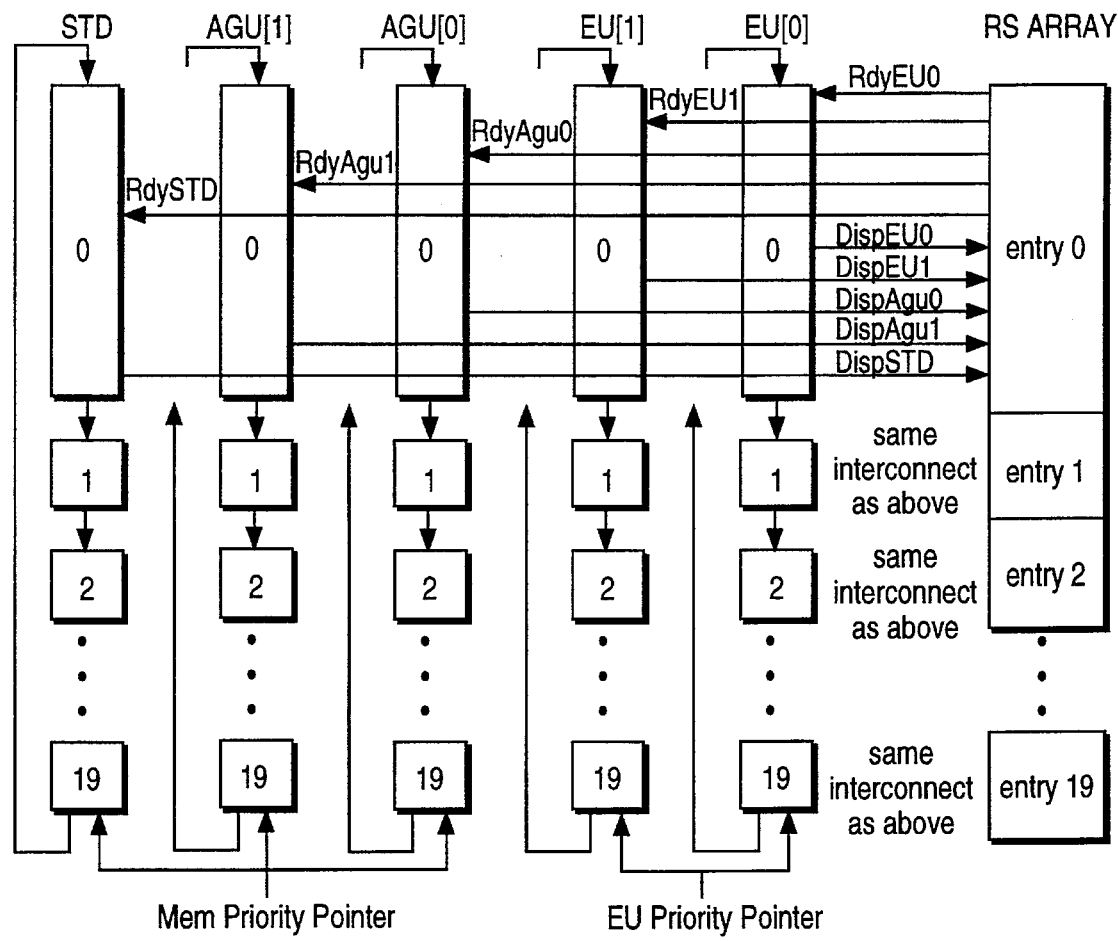
FIG. 5 is a representation of the plurality of schedulers used for a plurality of dispatch ports in accordance with a reservation station utilizing the present invention.

The basic function of the micro-op scheduler is to enable the scheduling of up to five micro-ops per clock cycle from the reservation station. The reservation station has five schedulers, one for each dispatch port. Each entry in the reservation station array has five ready signals, one for each execution unit scheduler. The purpose of the ready signals is to inform the scheduler to what possible execution unit a given micro-op may be dispatched. The five dispatch signals enable the appropriate read port for a given entry in the reservation station array and is illustrated graphically in FIG. 5.

The primary goal of the micro-op scheduler's operation is to approximate FIFO-type scheduling, i.e., the oldest ready micro-op will always be scheduled first when more than one micro-op is ready for the same execution unit at the same time. This will reduce stale entry effects which may hurt overall performance. Stale entry effects occur when older micro-ops in the array are given lower scheduling priority than newly written micro-ops. Because of the high rate of speed intended for the present microprocessor operate, a true FIFO-scheduler is impractical because of the effect it would have on the frequency of the processor and the amount of die area required. The reservation station thus implements a pseudo-FIFO scheduling algorithm to optimally schedule micro-ops for dispatch and keep stale data effects to a minimum.

As is illustrated in FIG. 3, included in the information kept in the reservation station memory array is an age field used to indicate how long each micro-op has been present in the reservation station. As an alternative to incorporating an age field within the array, an external counter or counters may be used on either a per entry or per group of entries basis for writing the counter value into a non-count age field. If a counter is allocated to a group of entries, new micro-ops written into the group will inherit the age of the entire group. In other embodiments, the age information may be eliminated altogether by using a pure sequential scanning technique.

The scheduling routine models the reservation station array as a circular queue and begins micro-op selection (sequential scan) dependent upon the relative age of the micro-ops in the array. Essentially, program order dictates scheduling priority when more than one micro-op is ready to be scheduled for the same execution unit interface. Each entry in the array has an age counter that saturates at a count 8. This counter is reset at initial allocation and is incremented for each new write into the array. The writing of new entries into the array at a given clock cycle will increment all other valid entries one count. As an alternative to incrementing the age counters on an array write, it may prove desirable on some implementations to only implement the age counters upon the writing of branch instructions. Additionally, counters may be implemented both internally or externally to the array dependent upon die area and other efficiency considerations. Likewise, the use of a counter which saturates at count 8 is incorporated in the preferred embodiment of the present invention but is not a limitation of the present invention where counters accommodating higher or lower counts are both conceivable.

The age information for a micro-op entry may also be used to control the priority of a given micro-op. Rather than having the age field or counter reset when the entry is written into the array, the age information may be set to a predetermined specific value thus artificially indicating that the entry has a higher priority than if it were treated as other newly written entries into the array. Compilers may take advantage of this feature to indicate when some instructions are of a higher priority than others.

FIG. 6 illustrates a portion of the execution pipeline of a microprocessor incorporating the preferred embodiment of the present invention. A solid line indicates the first half of the clock cycle while a dashed line separates a high clock from a low clock in a given clock cycle. The nomenclature of the pipeline stage numbers is presented in conformance with the preferred embodiment of the present invention. Each of these stages of the pipeline illustrated in FIG. 6 are those carried out for the pseudo-FIFO scheduling of dispatch from the reservation station and each will be described below:

At pipeline stage 29L the entry's age is either reset if it is being allocated or is incremented when new micro-ops are written in the array.

During pipe stage 30H, a poll is taken with respect to which entry for a given execution interface has the oldest age. Since there are 5 schedulers, up to 5 separate interface searches can be taken. The preferred embodiment implementation has 2 independent selections. EU[0]/1 are combined to form an age poll for all micro-ops in the array that are executable on these ports. AGU[0]/1 is the other age poll. The priority pointer generated from the EU[0]/1 age poll is sent to both the EU[0] and EU[1] schedulers. The priority pointer generated from the AGU[0] and AGU[1] age poll is sent to the AGU[0], AGU[1], and STD schedulers. It should be noted that STD micro-op's age information is not used in the preferred embodiment scheduling process. The STD ages can be ignored because their results are not as critical because other micro-ops will in general not be dependent upon a STD micro-op. In the preferred embodiment implementation the STD scheduler follows the AGU[0] and AGU[1] age group selections. Then at pipe stage 30L, the oldest age for a given interface is determined by the method to be described further herein.

At step 31H, the oldest age found for a given interface is broadcast through the array to find which entry has that age. If more than one entry has the same age for the given interface a scan for the first oldest is used to arbitrate. The priority pointers are then sent to the associated schedulers. Finally, at stage 31L priority pointers dictate which entry to begin schedule selection. If the oldest entry in the array for the given interface is not ready for execution, then a sequential scan is done with proper array wrap-around.

It should be noted that in the preferred embodiment implementation of the present invention circuit area and frequency limitations constrain the granularity of where the scheduler can begin oldest selection. The age detection and schedulers are broken up into 5 groups of 4 entries. Accordingly, when the age is broadcast in stage 31H, the group of 4 entries containing the oldest entry is found, not the oldest entry itself. The scheduler begins selection starting on a group boundary.

Once the priority pointer identifies the group of 4 entries which includes the oldest entry, the scheduler proceeds to schedule the first ready micro-op within the group regardless of the age of the first ready micro-op. It is possible that the oldest entry in the group is preceded by a ready, younger micro-op which then becomes scheduled prior to the scheduling of the older micro-op. Though the scheduling is not true FIFO in such a situation, these situations are not too common and are a fair trade off for the lower impact on frequency and die area required by the pseudo-FIFO scheduling mechanism.

There has thus been described a method and apparatus for the scheduling of dispatch of dependency ready micro-ops in a reservation station incorporated into a microprocessor. Although the present invention has been described in terms of preferred and implemented embodiments, it will be appreciated that various modifications and alterations might be made by those skilled in the art without departing from the spirit and scope of the present invention. The invention should, therefore, be measured in terms of the claims which follow.

What is claimed is:

1. An apparatus for scheduling the dispatch of instructions to a plurality of execution units within a microprocessor comprising:
    a reservation station memory array for storing data-dependent instructions until the data dependencies are resolved, wherein said data-dependent instructions are converted to data-ready instructions;
    a plurality of dispatch ports for coupling said reservation station memory array to each of said plurality of execution units, respectively;
    reservation station scheduling logic for controlling the dispatch of data-ready instructions from said reservation station memory array to said plurality of execution units; and
    ready bit logic coupled to said reservation station memory array and to said plurality of execution units for providing ready bit signals to said reservation station scheduling logic indicating when stored instructions are data-ready and identifying execution unit availability,
    wherein said reservation station scheduling logic sequentially scans through said reservation memory array triggering the dispatch of instructions for which said ready bit logic identified as being data-ready and having an available execution unit.

2. The apparatus of claim 1 further comprising means for tracking the age of an instruction in said reservation station.

3. The apparatus of claim 2 wherein said age tracking means comprises an age field associated and stored with each entry in said reservation station memory array, said age field being incremented upon a predetermined condition.

4. The apparatus of claim 3 wherein said scheduling logic comprises means for determining which group of N entries in the reservation station memory array contains the entry with the age field having the highest value, said reservation station scheduling logic beginning said sequential scan at the boundary of the group of N entries having the oldest entry.

5. The apparatus of claim 4 wherein said scheduling logic comprises a plurality of schedulers each, respectively, for scheduling data-ready instruction dispatch through one of said plurality of dispatch ports.

6. The apparatus of claim 5 wherein said plurality of schedulers are coupled together to provide for dynamic scheduling of data-ready instructions through multiple dispatch ports.

7. The apparatus of claim 4 wherein said group of N entries comprises four (4) entries.

8. The apparatus of claim 3 wherein said predetermined condition is the writing of a new entry into said reservation station memory array.

9. The apparatus of claim 3 wherein said predetermined condition is the writing of a branch instruction into said reservation station memory array.

10. The apparatus of claim 2 wherein said age tracking means comprises a plurality of counters, each associated with one entry in said reservation station memory array.

11. The apparatus of claim 2 wherein said age tracking means comprises a plurality of counters, each associated with a group of entries in said reservation station memory array.

12. The apparatus of claim 2 wherein said age tracking means is an external counter which writes its count value into said array when an entry is written into said array.

13. A computer system comprising:
    an input/output (I/O) means for providing a communications interface;
    a memory means coupled to said I/O means for storing instructions and computer data;
    data input means coupled to said I/O means for providing data input and data output to interface with a computer user; and
    microprocessor means coupled to said I/O means for executing instructions and processing computer data, said microprocessor means further comprising an apparatus for scheduling the dispatch of instructions to a plurality of execution units, said scheduling apparatus comprising:
        a reservation station memory array for storing data-dependent instructions until the data dependencies are resolved, wherein said data-dependent-instructions are converted to data-ready instructions;
        a plurality of dispatch ports for coupling said reservation station memory array to each of said plurality of execution units, respectively;

reservation station scheduling logic for controlling the dispatch of data-ready instructions from said reservation station memory array to said plurality of execution units; and ready bit logic coupled to said reservation station memory array and to said plurality of execution units for providing ready bit signals to said reservation station scheduling logic indicating when stored instructions are data-ready and identifying execution unit availability, wherein said reservation station scheduling logic sequentially scans through said reservation memory array triggering the dispatch of instructions for which said ready bit logic identified as being data-ready and having an available execution unit.

14. The apparatus of claim 13 further comprising means for tracking the age of an instruction in said reservation station.

15. The apparatus of claim 14 wherein said age tracking means comprises an age field associated and stored with each entry in said reservation station memory array, said age field being incremented upon a predetermined condition.

16. The apparatus of claim 15 wherein said predetermined condition is the writing of a new entry into said reservation station memory array.

17. The apparatus of claim 15 wherein said predetermined condition is the writing of a branch instruction into said reservation station memory array.

18. The apparatus of claim 15 wherein said scheduling logic comprises means for determining which group of N entries in the reservation station memory array contains the entry with the age field having the oldest value, said reservation station scheduling logic beginning said sequential scan at the boundary of the group of N entries having the oldest entry.

19. The apparatus of claim 14 wherein said age tracking means comprises a plurality of counters, each associated with one entry in said reservation station memory array.

20. The apparatus of claim 14 wherein said age tracking means comprises a plurality of counters, each associated with a group of entries in said reservation station memory array.

21. A method of scheduling the dispatch of resource-ready instructions from a reservation station, said reservation station being coupled to a plurality of functional units for receiving and executing resource-ready instructions, said reservation station comprising a memory array for maintaining a plurality of entries of microprocessor instructions wherein when all data and functional unit dependencies for a given instruction entry are satisfied said instruction is considered resource-ready, said method comprising the steps of:

maintaining age information concerning entries in said reservation station memory array for indicating the length of time since a given instruction had been written into said reservation station;

finding the oldest entry in said reservation station;

sequentially scanning said reservation station memory array to find the first resource-ready instruction following said oldest entry if said oldest entry is not resource ready;

dispatching said first resource-ready instruction following said oldest entry to its designated functional unit; and deallocating the reservation station entry for the dispatched instruction.

22. The method of claim 21 where in said finding step comprises the steps of:

grouping said reservation station entries into N groups of entries; and broadcasting from each of said N groups the age of the oldest entry in the group, said sequential scanning step then beginning at the beginning of group of entries having the oldest entry.

23. The method of claim 21 further comprising the step of incrementing the age of all previously written entries in the reservation station when a new entry is written to the reservation station memory array.

24. The method of claim 21 further comprising the step of incrementing the age of all entries in the reservation station when a branch instruction is written into the reservation station memory array.

25. The method of claim 21 further comprising the step of setting the age field of an entry in said reservation station to a predetermined value to affect the priority of said entry.

* * * * *